United States Patent [19]

Connaughty et al.

[11] Patent Number: 4,650,124
[45] Date of Patent: Mar. 17, 1987

[54] CHEMICAL SPRAY APPLICATOR

[75] Inventors: Kenneth G. Connaughty; Gary P. Olson, both of Lanesboro, Minn.

[73] Assignee: AG Systems, Inc., Hutchinson, Minn.

[21] Appl. No.: 734,403

[22] Filed: May 14, 1985

[51] Int. Cl.$^4$ .............................................. B05B 5/02
[52] U.S. Cl. .................................... 239/708; 239/113; 239/157; 239/168; 239/307; 239/310
[58] Field of Search ................. 239/157, 163, 166–168, 239/304, 305, 307, 310, 332, 708, 113

[56] References Cited

U.S. PATENT DOCUMENTS

| | | | |
|---|---|---|---|
| 2,575,521 | 11/1951 | Ireland | 239/168 |
| 2,657,949 | 11/1953 | Morrison | 239/167 |
| 2,963,226 | 12/1960 | La Roque | 239/157 |
| 3,425,628 | 2/1969 | Reams | 239/168 |
| 3,581,993 | 6/1971 | Reams | 239/168 |
| 4,252,274 | 2/1981 | Kubacak | 239/305 |
| 4,358,054 | 11/1982 | Ehrat | 239/304 |

FOREIGN PATENT DOCUMENTS

| | | | |
|---|---|---|---|
| 2450035 | 10/1980 | France | 239/168 |
| 1153868 | 5/1969 | United Kingdom | 239/708 |
| 2110063 | 5/1983 | United Kingdom | 239/159 |

Primary Examiner—Joseph F. Peters, Jr.
Assistant Examiner—Michael J. Forman
Attorney, Agent, or Firm—Merchant, Gould, Smith, Edell, Welter and Schmidt

[57] ABSTRACT

An agricultural sprayer (10) comprises a mobile frame (12) supporting a spray system (90) in which the water and chemical concentrate are stored in separate tanks (92, 94, 96 and 98) for mixture in the desired ratio as needed responsive to travel of the sprayer so as to facilitate application at the proper rate. The frame (12) preferably comprises a main frame section (14) with outboard pairs of pivotal frame sections (16, 18) which are individually supported by adjustable gauge wheels (34, 54) movable between raised and lowered positions relative to the ground by actuator assemblies (60). The spray system (90) includes a water tank (92) and a plurality of chemical tanks (94, 96 and 98) connected through individual shut-off valves, adjustable, positive displacement pumps, and an electrostatic water treater, to a plurality of spray heads.

16 Claims, 7 Drawing Figures

CHEMICAL SPRAY APPLICATOR

TECHNICAL FIELD

The present invention relates generally to agricultural implements. More particularly, this invention concerns an improved applicator for spraying liquid chemicals such as fertilizers, insecticides and pesticides on crops or soil with more precise metering and control.

BACKGROUND ART

Various chemicals are used in farming today to improve productivity and yield. Such chemicals can take either liquid or granular form, and can comprise fertilizers, pesticides, or insecticides which tend to be relatively expensive and must be applied at the proper rate to achieve the intended purposes without undue waste of the chemical and/or lost productivity and yield.

Various liquid chemical applicators or sprayers have been available heretofore. Such sprayers generally incorporate a large tank connected by suitable lines and pumps to nozzles or spray heads mounted along a transverse tool bar. The chemical concentrate is first mixed in the proper ratio with water in the tank on a batch basis after which the sprayer is driven or towed across the field to effect application by means of spraying. Application at the proper rate depends upon proper coordination of the spray rate of chemical mixture and the speed of the applicator.

Although the chemical sprayers of the prior art have been generally satisfactory, they have not been without drawbacks. The primary drawback is the need to carefully coordinate the speed of the sprayer and the spray rate to achieve the proper application. Although electronic monitors are available for helping the driver to coordinate the speed and flow rate, such devices tend to be complicated and expensive, and so this is typically done by the operator on a trial-and-error basis. If the sprayer is driven or towed too fast, this results in under-application of the chemical, resulting in leftover chemical mixture which most often goes to waste because it cannot be stored or used. Re-spraying is impractical. Conversely, driving or towing the sprayer too slowly causes over-application and thus early runout of chemical, resulting in lost time and more expense in returning to refill the tank with water and chemical concentrate. These difficulties of course lend uncertainty to the amount of chemical to be purchased for use, and thus excess chemical concentrate is often unnecessarily purchased.

Another drawback to the chemical sprayers of the prior art has been the manner in which the spray heads or nozzles are supported and maintained at an effective distance above the ground or plants as the sprayer is driven or towed across the field. It will be appreciated that farm fields can be rough and uneven, and that such sprayers are subject to bumps and shocks which affect the spacing for proper application. Mounting the spray heads or nozzles on rigid tool bars does not compensate for unevenness of the fields. Shock absorber systems can be adapted to such sprayers, but these tend to be relatively complicated and expensive, and they may not effectively maintain the proper spacing over bumps as well as depressions.

Yet another drawback to the prior devices is that once the liquid and chemical concentrate are mixed in the tank, neither the mixture ratio nor the type chemical being applied can then be readily changed. Changeover from one chemical to another is time-consuming and expensive, and usually cannot be done in the field. It is impractical to store unused chemical mixture particularly from one planting season to the next. Also, such mixture is at least mildly toxic and should be disposed of in an environmentally-safe manner, but often has not been done so for reasons of expedience.

There is thus a need for an improved chemical sprayer which automatically compensates for speed to avoid the guesswork in achieving proper application, and which stores the chemical concentrate and water in separate tanks for mixture as needed during application so that any excess concentrate is not diluted and can thus be stored for use later.

SUMMARY OF INVENTION

The present invention comprises a chemical sprayer which overcomes the foregoing and other difficulties associated with the prior art. In accordance with the invention, there is provided a mobile chemical sprayer comprising a water tank connected in fluid communication with a plurality of laterally spaced-apart spray heads. A manual shut-off valve and ground-driven pump are connected between the water tank and the spray heads. At least one chemical tank and associated manual shut-off valve and ground-driven pump are teed into the line between the water pump and the spray heads. The water and chemical pumps are preferably adjustable positive displacement pumps which can be adjusted as necessary to set the desired flow rates of water and chemical, and thus the proper mixture thereof, depending upon the speed of application. An electrostatic water treater is preferably provided between the spray heads and the points where the water and chemical concentrate come together so as to impart an electrostatic charge on the liquid mixture before discharge through the spray heads, which are preferably of the rotary type, in order to achieve more effective application under windy conditions. If desired, a bypass including an auxiliary shut-off valve and electric pump can be provided across the water pump so that the lines can be flushed of water and chemicals after use.

In accordance with the preferred embodiment, the chemical sprayer is mounted on a frame having a main base section and opposite pairs of inner and outer pivotal outboard sections. Segmented portions of the tool bar supporting the spray heads are mounted on the frame sections. The main frame section is supported by a pair of rotatable wheels, which are drivingly-connected with the water and chemical pumps. Each pivotal inner and outboard frame section is supported by an individual ground-engaging wheel to compensate for ground unevenness and thus maintain proper elevation of the spray heads during operation. If desired, a shroud can be mounted over the frame and spray heads to further improve performance under windy conditions.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
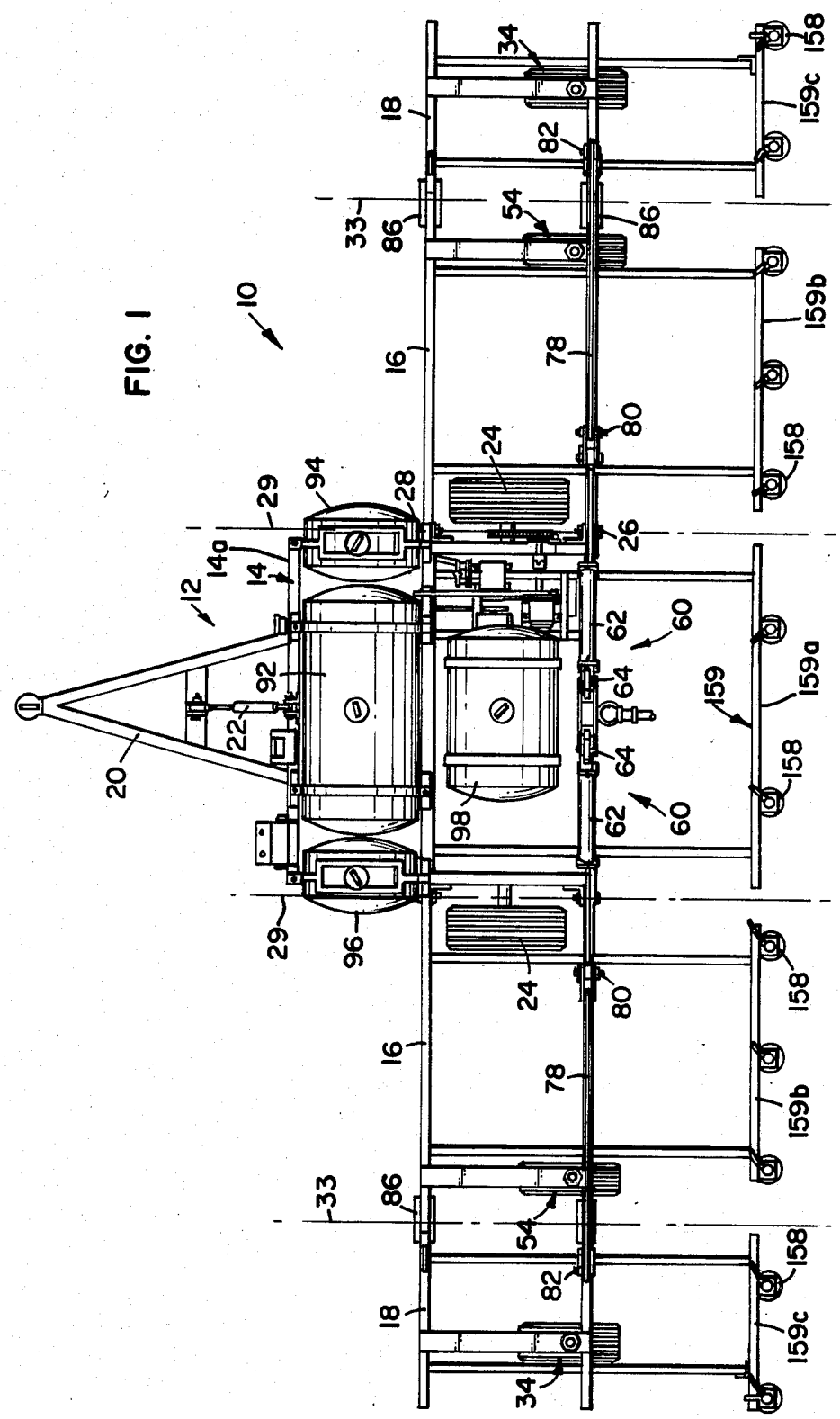
FIG. 1 is a top plan view of the chemical sprayer incorporating the invention.

Referring now to the Drawings, wherein like reference numerals designate like or corresponding elements throughout the views, there is shown the chemical spray applicator 10 of the invention. As will be explained more fully hereinafter, the spray applicator 10 includes an improved frame having floating outboard pivotal sections which follow the contour of the ground, as well as an improved flow control system in which the water and chemical concentrate are stored separately but mixed in the desired ratio for proper application as needed depending upon the speed of travel, in order to accomplish more precise and effective spraying.

Figure 2:
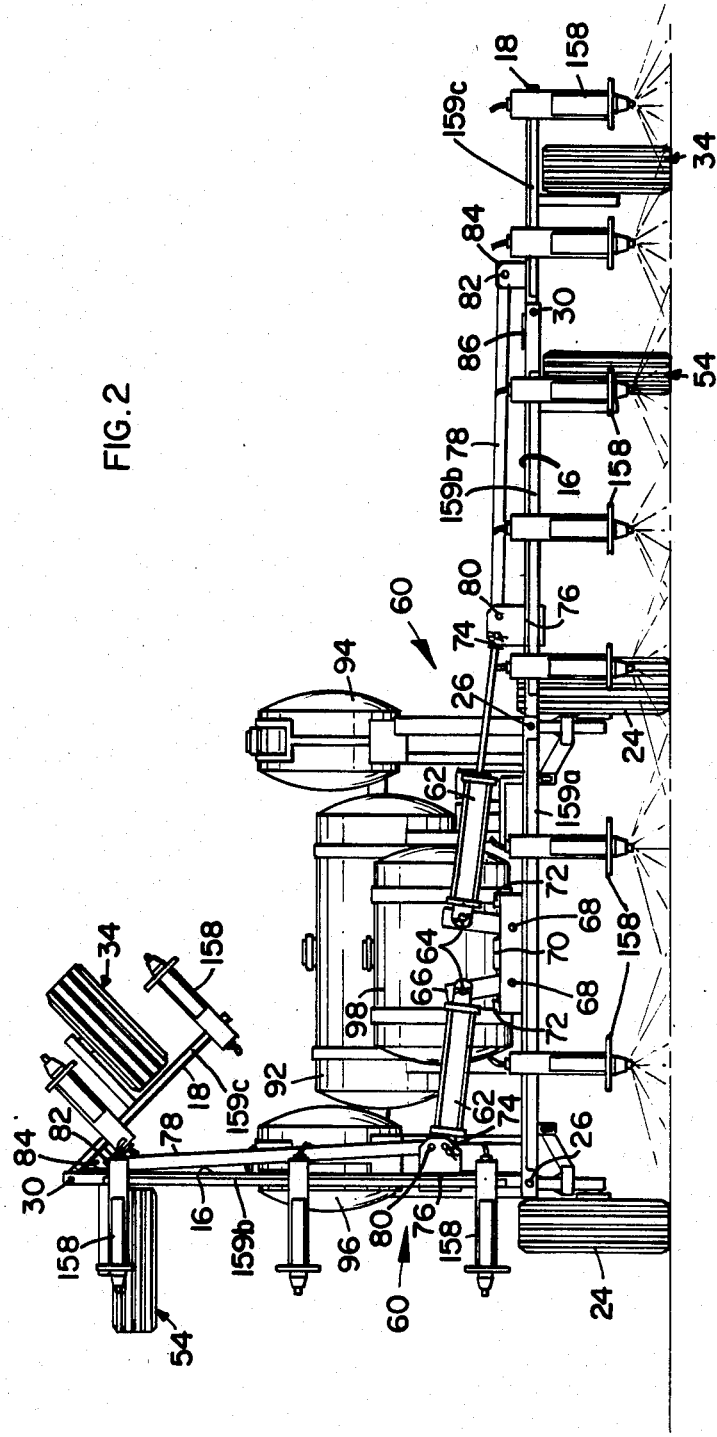
FIG. 2 is a rear elevation view of the chemical sprayer herein, showing opposite outboard frame sections in the down or raised positions.
Figure 3:
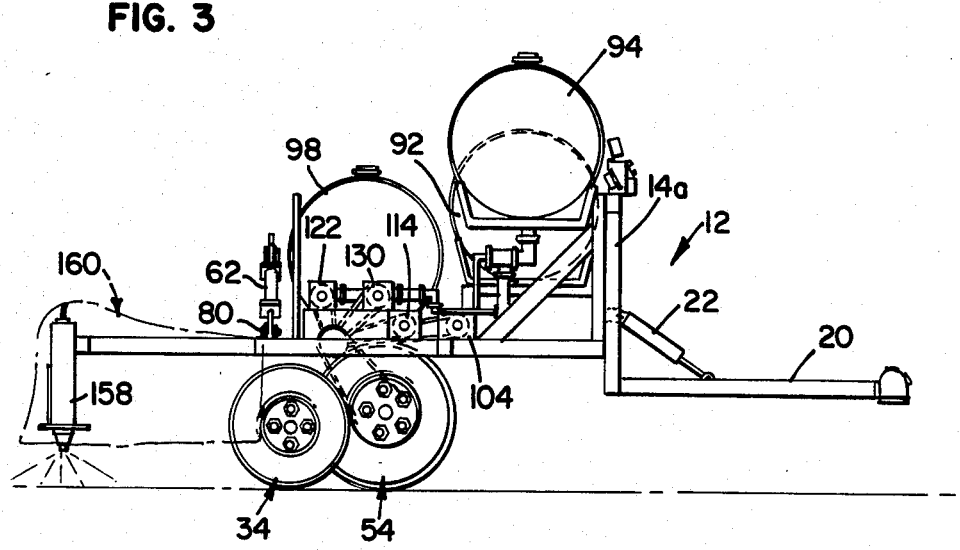
FIG. 3 is an end view of the chemical sprayer herein.

Referring now to FIGS. 1-3 the chemical spray applicator 10 includes a frame 12 comprising a main frame section 14 and opposite pairs of outboard pivotal sections 16 and 18. The frame 12 and frame sections 14, 16 and 18 are constructed from suitable sections of structural members, such as rectangular metal tubing, arranged and welded together into a rigid unit. A drawbar hitch 20 is secured to the forward end of the main frame section 14, and an adjustable link 22 is secured between the drawbar hitch and a vertical portion 14a of the main frame section for adjustment in accordance with the type of tractor or tow vehicle with which the chemical spray applicator 10 is to be used. The frame 12 is supported primarily by a pair of main support wheels 24 which are mounted for rotation on the main frame section 14.

The outboard frame sections 16 and 18 are connected for pivotal movement relative to each other and relative to the main frame section 14. In particular, the inner pivotal sections 16 are each connected to the respective sides of the main frame section 14 by longitudinally spaced-apart pivots 26 and 28 defining an inner longitudinal pivot axis 29. The outer pivotal section 18 is connected to the side of the associated inner pivotal section 16 by longitudinally spaced-apart pivots 30 and 32 defining an outer longitudinal pivot axis 33. It will thus be appreciated that the outer frame sections 18 are pivotal relative to the inner frame sections 16 which are pivotal relative to the main frame section 14.

Figure 4:
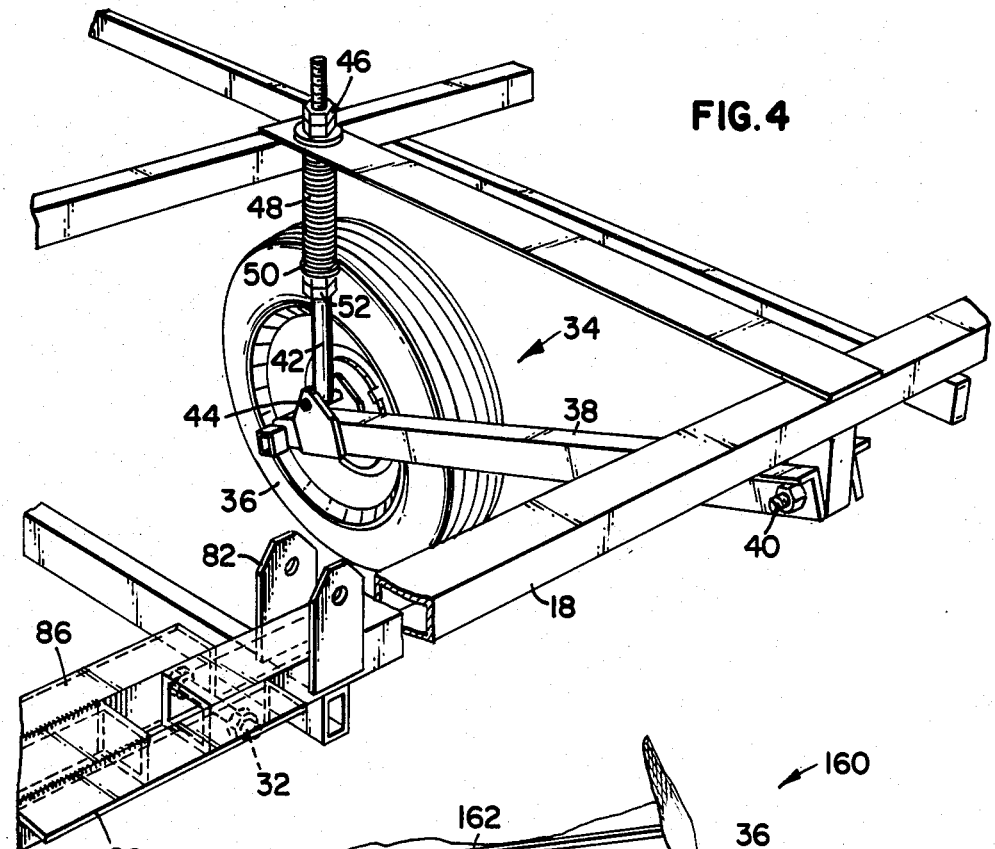
FIG. 4 is an enlarged front-quarter perspective view showing the adjustable ground-support wheel assembly of the type used with the inner and outer pivotal frame sections.

In addition to the support wheels 24 on the main frame section 14, an auxiliary support wheel is also provided on each pivotal frame sections 16 and 18. For example, an adjustable gauge-wheel assembly like that shown in FIG. 4 can be provided on each outer pivotal frame section 18. The gauge-wheel assembly 34 includes a wheel 36 mounted for rotation at the rear end of a trailing link 38 which is connected by a pivot 40 at its leading end to the frame section 18. An upright link 42 is connected at its lower end by pivot 44 to the trailing link 38. The upper end of the link 42 slideably extends through a hole in the outer frame section 18. A nut 46 is provided on the threaded upper end of the link 42, and rotation of the nut defines the lowermost position of the gauge-wheel assembly 34. A compression spring 48, follower 50, and lower nut 52 are provided on the link 42 on the underside of frame 18 for defining the uppermost position of the adjustable gauge-wheel assembly 34 and the spring tension thereon. Adjustable gauge-wheel assemblies 34 of similar construction are provided on the inner pivotal frame sections 16.

The pivotal frame sections 16 and 18 are thus independently pivotal as well as independently, adjustably supported above the ground.

The pivotal frame sections 16 and 18 on each side of the frame 12 are controlled by actuator assemblies 60, which are preferably individually controlled. Each actuator assembly includes a laterally-extending double-acting cylinder 62 connected at its base end by a pivot 64 to the upper end of a link 66. The lower end of link 66 is connected by pivot 68 to the main frame section 12 for pivotal movement between arc limits defined by an inner stop 70 and an outer stop 72. The inner stop 70 is common to both of the actuator assemblies 60. The outer end of cylinder 62 is connected by pivot 74 to a slide 76 mounted for movement along a lateral portion of the inner pivotal frame section 16. A rigid link 78 is coupled between another pivot 80 on slide 76 and a pivot 82 on lug 84 on the outer pivotal frame section 18.

When cylinder 62 retracts, arm 66 engages the outer stop 72, and slide 76 moves inwardly along frame section 16 to effect upward pivotal movement of the outer frame section 18 first, about axis 33. The slide 76 is drawn inwardly until it engages appropriate stop structure such as a longitudinal cross member, located in spaced-relationship with pivots 26 and 28. Stop plates 86 are provided on frame section 16 for engagement with lugs 84 and 88 on the folded section 18. After the slide 76 stops out, continued retraction of cylinder 62 then pivots the inner frame section 16 upwardly about axis 29, along with the folded outer frame section 18, to the raised position illustrated on the left side of FIG. 2.

Extension of cylinder 62, of course, positions the frame sections 16 and 18 in the reverse sequence downward as illustrated on the right side of FIG. 2. In this position, it will be noted that link 66 is positioned in spaced-relationship between stops 70 and 72, so that the frame sections 16 and 18 can pivot upwardly or downwardly between predetermined limits so as to "float" over the underlying ground and thus maintain substantially uniform vertical spacing relative to the spray heads to be described. The use of ground-supported inner and outer, independently pivotal frame sections 16 and 18, together with actuator assemblies 60, comprise important features of the present invention.

Figure 6:
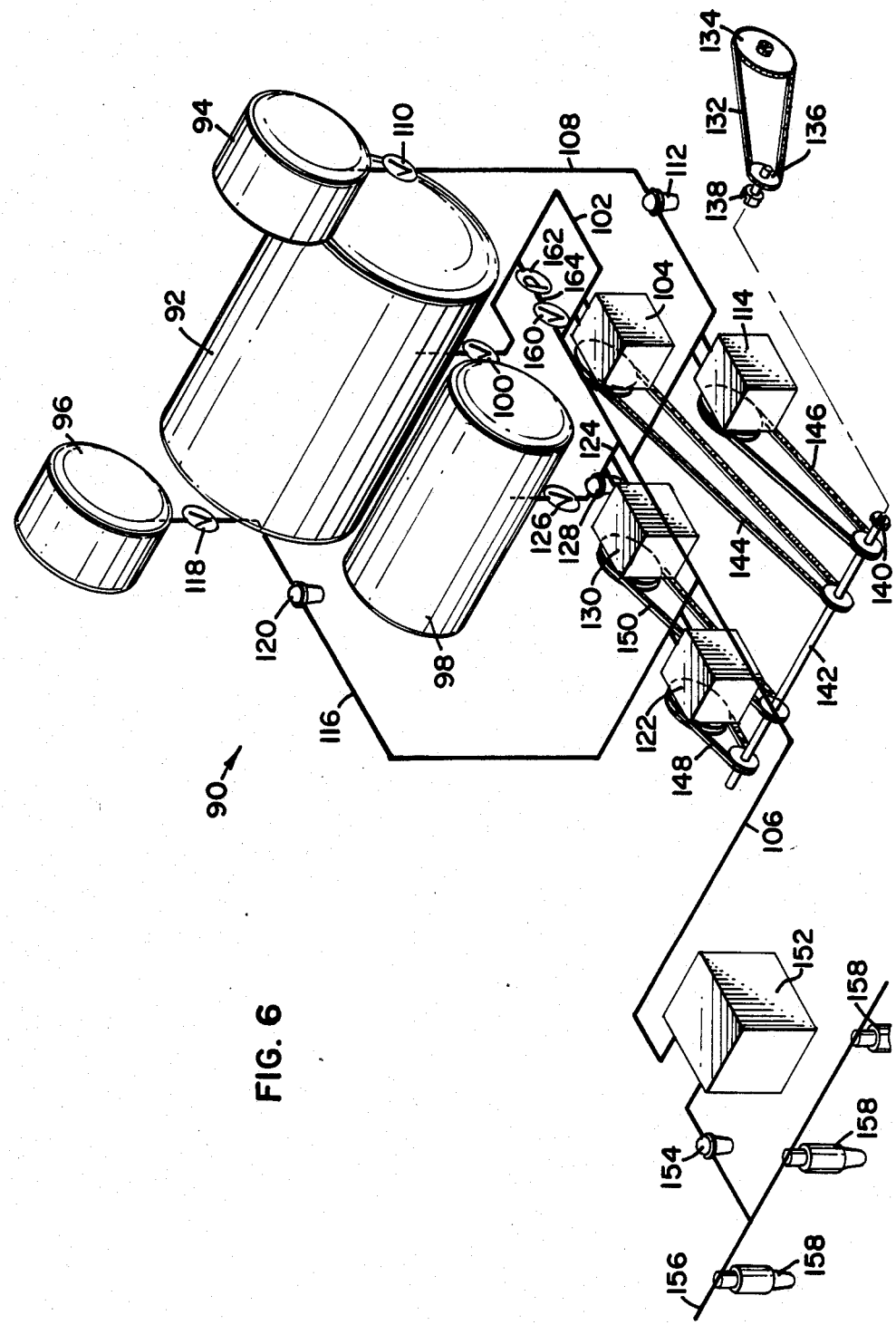
FIG. 6 is a perspective view of the flow and drive system of the chemical sprayer herein.

Referring now to FIG. 6 in conjunction with FIGS. 1-3, there is shown the spray system 90 of the chemical spray applicator 10. The spray system 90 includes a water tank 92 and at least one chemical tank supported on the frame portion 14a. As illustrated, three separate chemical tanks 94, 96 and 98 are provided. The tanks 92, 94, 96 and 98 are of conventional translucent, plastic construction with top fill openings and bottom discharge openings. The water tank 92 is connected through valve 100, line 102, and pump 104 to a main feed line 106. The chemical tank 94 is connected via line 108 through valve 110, strainer 112, and pump 114 to the main feed line 106. The chemical tank 96 is similarly connected through line 116, valve 118, strainer 120, and pump 122 to the main feed line 106. Similarly, the chemical tank 98 is connected via line 124, valve 126, strainer 128, and pump 130 to the main feed line. The chemical supply lines 108, 116 and 124 thus connect to the feed line 106 downstream of the water supply line 102.

The water and the chemical concentrates are kept in separate tanks and are mixed in the desired ratio as needed during spraying by individual pumps, which are driven responsive to the speed of the chemical spray applicator 10. Each of the pumps 104, 114, 122 and 130 is preferably of the adjustable, positive displacement type whose stroke can be manually or automatically adjusted to increase or decrease flow rate for a given pump speed. For example, suitable manually-adjustable positive displacement pumps of this type can be obtained from John Blue Company of Sioux Falls, S. Dak.

The pumps 104, 114, 122 and 130 of the flow system 90 are preferably connected to one of the ground-support wheels 24 of frame 12. As shown, chain 132 connects drive sprocket 134 on one of the wheels 24 with a driven sprocket 136 on a jack shaft 138 which is connected via a dog clutch 140 to a second co-axial jack shaft 142. The pumps 104, 114, 122 and 130 are commonly driven off the jack shaft 142 by separate chain-and-sprocket arrangements 144, 146, 148 and 150, respectively. If desired, individual clutches can be provided in the chain-and-sprocket arrangements 144, 146, 148 and 150 for selectively disengaging the pumps as desired.

In accordance with the preferred construction, an electrostatic water treater 152 and strainer 154 are connected between the main supply line 106 and the common feed line 156 interconnecting the spray heads 158 mounted along tool bar 159 on frame 12. The tool bar 159 is preferably of segmented construction including sections 159a, 159b, and 159c mounted on the trailing ends of frame sections 14, 16, and 18, respectively. As illustrated, two spray heads 158 are mounted on the tool bar section 159a of the main frame section 14 and tool bar sections 159c of pivotal frame sections 18, with three spray heads being mounted on each section 159b of the pivotal frame sections 16. Any suitable liquid electrostatic unit can be utilized. For example, an electrostatic water treater of the type available from Tri-County Water Conditioning of St. Peter, Minn., can be used for the water treater 152. Any suitable spray heads can be used for spray heads 158, however, in the preferred embodiment roto-jet nozzles of the type available from Spray Systems of Wheaton, Ill., are utilized.

In accordance with the preferred construction, a normally closed valve 160 and auxiliary electric pump 162 are provided in a bypass line 164 across the water pump 104 for flushing any excess water and chemical from the lines of the spray system 90 after use when pumps 104, 114, 122 and 130 are not operating. In order to do so, the water shutoff valve 100 and the chemical shut-off valves 110, 118 and 126 would be closed, while valve 160 would be opened and the auxiliary pump 162 turned on.

Figure 5:
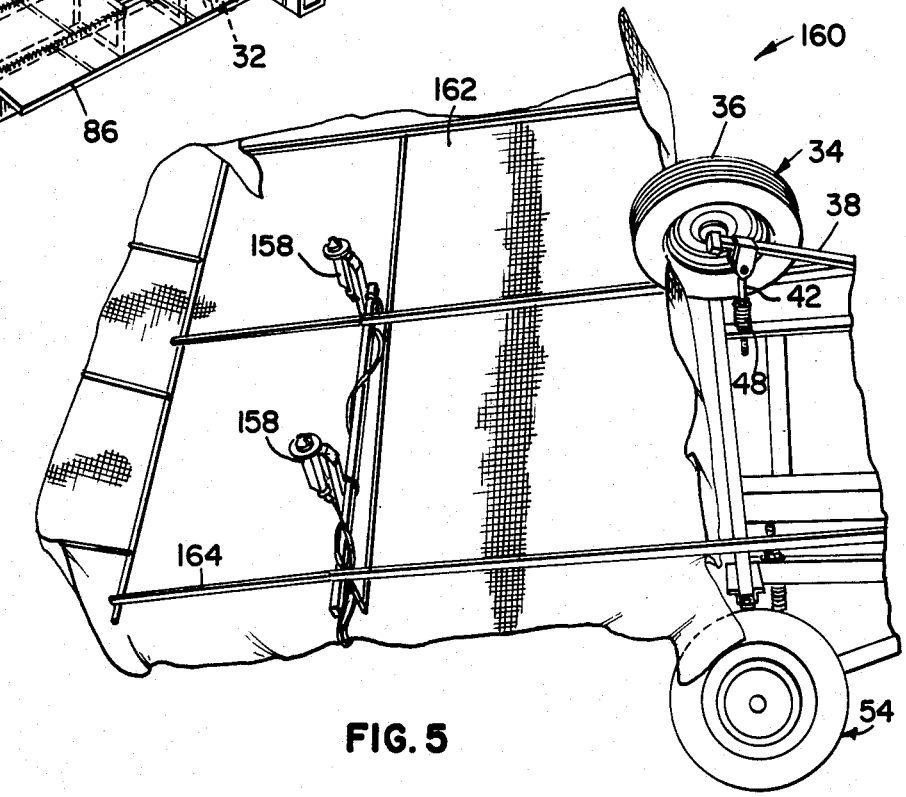
FIG. 5 is a side view showing the inner and outer frame sections on one side of the sprayer pivoted upwardly, with the optional protective wind shroud thereon.

Referring to FIGS. 3 and 5, if desired, the chemical spray applicator 10 can be provided with a shroud assembly 160 including a flexible plastic cover 162 and a trailing framework 164 mounted on each of the frame sections 14, 16 and 18. The ends of cover 162 are draped over the outer pivotal frame sections 18, while the leading and trailing edges of the cover are draped over the corresponding sides of frame 12 and the trailing framework 164 so as to partially enclose the rotary spray heads 158 for more effective spray application under windy conditions. Usage of the shroud assembly 160 is optional, however.

Figure 7:
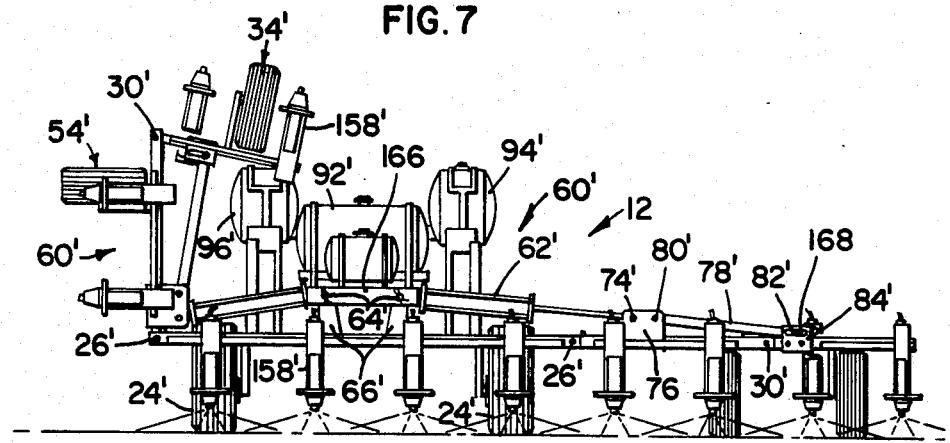
FIG. 7 is a reduced rear elevation view of the chemical sprayer herein, with modified actuator assemblies connected between a modified main frame and the outboard pivotal frame sections.

Referring now to FIG. 7, there is shown the spray applicator 10 with modified actuator assemblies 60' for controlling pivotal movement and float of the outboard frame sections 16 and 18. A cross-link 166 is connected between the upright links 66', and a slot 168 is provided in the lug 84' for receiving pivot 82' to define a pin-and-slot connection. This arrangement is considered the full mechanical equivalent of the actuator assemblies 60 shown in FIG. 2, except that the lost motion connection for purposes of float is provided at the middle and outboard ends of the modified actuator assemblies 60' instead of at the inboard end as in the actuator assemblies 60. FIG. 7 also shows a modified frame 12' with a wider main frame section 14 carrying four spray heads 158' and the pivotal frame sections 16' and 18' each carrying two spray heads.

From the foregoing, it will thus be apparent that the present invention comprises an improved chemical spray applicator having numerous advantages over the prior art. One significant advantage is that the water and chemical concentrate are maintained in separate tanks and are only mixed on demand in the desired ratio responsive to the speed of travel to effect application at the proper rate without the guesswork or waste of the prior approach. Another important advantage involves the use of an articulated frame having independently pivotal inner and outer frame sections supported by adjustable gauge-wheel assemblies for floating movement over the ground so that the spray heads are maintained in substantially constant predetermined spacing above the ground. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. An agricultural spray applicator, comprising:

a mobile frame having front and rear ends and opposite sides;

said mobile frame including a central main frame section, a pair of inner frame sections pivoted to opposite sides of the main frame section, and a pair of outer frame sections pivoted to opposite sides of the inner frame section;

a movable slide mounted on each inner frame section;

a rigid link pivotally connected between each slide and the associated outer frame section;

actuator means coupled between the main frame section and each slide for selectively effecting relative pivotal movement of said inner and outer frame sections between raised and lowered positions;

a water tank mounted on said frame;

at least one chemical tank mounted on said frame;

a plurality of downwardly-directed sprayers mounted in laterally spaced-apart relationship on said frame;

a supply line connecting said sprayers with said water tank and each chemical tank;

a first shut-off valve connected between said supply line and said water tank;

a first pump connected between said first valve and said supply line;

a second shut-off valve connected between each chemical tank and said supply line;

a second pump connected between each second valve and said supply line; and means for driving said first and second pumps responsive to travel of said frame to effect mixture of liquids from said water and chemical tanks in the desired ratio and discharge of the resultant mixture through said sprayers.

2. The agricultural spray applicator of claim 1, wherein said mobile frame is supported by a pair of laterally spaced-apart rotatable ground-engaging wheels, and further including:

a drawbar hitch secured to the front end of said frame.

3. The agriculture spray applicator of claim 1, wherein said first and second pumps are each of the positive displacement type having manually-adjustable strokes.

4. The agricultural spray applicator of claim 1, wherein said pump drive means comprises:

a ground-engaging wheel;

a drive sprocket secured to said wheel;

a first rotatable half shaft;

a driven sprocket mounted on said first rotatable half shaft;

a chain interconnecting said drive and driven sprockets;

a second rotatable half shaft;

a dog clutch interconnecting said first and second half shafts; and individual chain-and-sprocket assemblies drivingly interconnecting said second half shaft and each of said first and second pumps.

5. The agricultural spray applicator of claim 1, further including:

electrostatic means connected in said supply line for imparting an electrical charge to the mixture before discharge through said sprayers.

6. The agriculatural spray applicator of claim 1, further including:

a bypass line connected across said first pump;

a normally closed auxiliary valve connected in said bypass line; and an auxiliary electric pump connected in said bypass line between said auxiliary valve and said first valve.

7. An agricultural spray applicator, comprising:

a central main frame section having front and rear ends and opposite sides;

a pair of laterally spaced-apart rotatable groundengaging wheels mounted on said main frame section;

a hitch secured to the front end of said main frame section;

a water tank mounted on said main frame section;

a plurality of chemical tanks mounted on said main frame section;

a pair of inner frame sections connected to opposite sides of said main frame section for pivotal movement;

a pair of outer frame sections connected to the sides of said inner frame sections opposite said main frame section for pivotal movement;

a first gauge wheel mounted on each inner frame section;

a second gauge wheel mounted on each outer frame section;

a movable slide mounted on each inner frame section;

a rigid link pivotally connected between each slide and the associated outer frame section;

actuator means coupled between the main frame section and each slide for selectively effecting relative pivotal movement of said inner and outer frame sections between raised and lowered positions;

a plurality of downwardly-directed sprayers mounted in laterally spaced-apart relationship along said frame sections;

a supply line connecting said sprayers with said water tank and each chemical tank;

a first pump connected between said first valve and said supply line;

a second shut-off valve connected between each chemical tank and said supply line;

a second pump connected between each second valve and said supply line;

means for driving said first and second pumps responsive to travel of said frame to effect mixture of liquid from said water and chemical tanks in the desired ratio and discharge of the resultant mixture through said sprayers; and electrostatic means connected to said supply line for imparting an electrical charge to the mixture before discharge through said sprayers.

8. The agricultural spray applicator of claim 7, wherein said first and second pumps are each of the positive displacement type having manually-adjustable strokes.

9. The agricultural spray applicator of claim 7, wherein said pump drive means comprises:

a ground-engaging wheel;

a drive sprocket secured to said wheel;

a first rotatable half shaft;

a driven sprocket mounted on said first rotatable half shaft;

a chain interconnecting said drive and driven sprockets;

a second rotatable half shaft;

a dog clutch interconnecting said first and second half shafts; and individual chain-and-sprocket assemblies drivingly interconnecting said second half shaft and each of said first and second pumps.

10. The agricultural spray applicator of claim 7, further including:

a bypass line connected across said first pump;

a normally closed auxiliary valve connected in said bypass line; and an auxiliary electric pump connected in said bypass line between said auxiliary valve and said first valve.

11. A frame for an agricultural implement, such as a sprayer, comprising:

a mobile main frame section having front and rear ends and opposite sides;

a hitch secured to the front end of said main frame section;

a pair of inner frame sections connected to opposite sides of said main frame section for pivotal movement about first generally-longitudinal, laterally spaced-apart axes;

a pair of outer frame sections connected to the sides of said inner frame sections opposite said main frame section for pivotal movement about second generally-longitudinal, laterally spaced-apart axes;

a first gauge wheel mounted on each inner frame section;

a second gauge wheel mounted on each outer frame section;

a movable slide mounted on each inner frame section;

a rigid link pivotally connected between each slide and the associated outer frame section; and actuator means coupled between the main frame section and each slide for selectively effecting relative pivotal movement of said inner and outer frame sections between raised and lowered positions.

12. The frame of claim 11, wherein said actuator means comprises a doubleacting cylinder.

13. The frame of claim 11, wherein said first and second gauge wheels are each vertically adjustable.

14. The frame of claim 11, further including:
a pair of laterally-spaced-apart ground-engaging wheels mounted for rotation on said main frame section.

15. The frame of claim 11, further including:
a slotted connection between said link and said associated outer frame section.

16. The frame of claim 11, further including:
a pivotal link coupled between each actuator means and said main frame section; and
stop means for limiting pivotal movement of each link over a predetermined arc.

* * * * *